(12) United States Patent
Bolle et al.

(10) Patent No.: US 6,668,078 B1
(45) Date of Patent: Dec. 23, 2003

(54) SYSTEM AND METHOD FOR SEGMENTATION OF IMAGES OF OBJECTS THAT ARE OCCLUDED BY A SEMI-TRANSPARENT MATERIAL

(75) Inventors: Rudolf M. Bolle, Bedford Hills, NY (US); Jonathan Connell, Cortland Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 09/676,883

(22) Filed: Sep. 29, 2000

(51) Int. Cl.[7] .............. G06K 9/00; G06K 9/46; G06K 9/68; G01N 21/00
(52) U.S. Cl. .............. 382/164; 382/218; 382/190; 382/110; 356/237.1; 356/240.1
(58) Field of Search ................. 382/162, 164, 382/165, 110, 170, 171, 173, 167, 190, 218, 219, 274; 356/302, 303, 306, 307, 240.1, 237.1, 238.1, 239.3, 239.4, 239.7, 237.6, 328; 358/515, 518, 520, 464; 702/128

(56) References Cited

U.S. PATENT DOCUMENTS

| | | | |
|---|---|---|---|
| 4,314,281 A | 2/1982 | Wiggins et al. | 358/406 |
| 4,625,231 A | 11/1986 | Vlahos | 348/587 |
| 5,546,475 A | 8/1996 | Bolle et al. | 382/190 |
| 5,570,186 A * | 10/1996 | Satzger et al. | 356/613 |
| 5,631,976 A | 5/1997 | Bolle et al. | 382/174 |
| 5,867,265 A * | 2/1999 | Thomas | 356/328 |
| 6,266,136 B1 * | 7/2001 | Ramer et al. | 356/139.03 |
| 6,332,573 B1 * | 12/2001 | Gu et al. | 235/462.06 |
| 6,431,446 B1 * | 8/2002 | Gu et al. | 235/454 |
| 6,501,547 B1 * | 12/2002 | Spencer et al. | 356/328 |
| 6,606,579 B1 * | 8/2003 | Gu | 702/181 |

OTHER PUBLICATIONS

Dana H. Ballard, Christopher M. Brown, "Computer Vision," 1982, Ch. 2 Image Formation, Sec. 2.2 Image Model, pp. 31–35.
Dana H. Ballard, Christopher M. Brown, "Computer Vision,", 1982, Ch. 3, Early Processing, Sec. 3.2 Filtering the Image, pp. 72–73.
Dana H. Ballard, Christopher M. Brown, "Computer Vision," 1982, Ch. 5, Region Growing, Sec. 5.2 A Local Technique: Blob Coloring, pp. 149–152.

* cited by examiner

Primary Examiner—Andrew W. Johns
Assistant Examiner—Amir Alavi
(74) Attorney, Agent, or Firm—Louis J. Percello

(57) ABSTRACT

An image processing system segments an object from the background of a scene where the scene is illuminated by unknown ambient light sources. An image of the scene with the object and an image of the background scene are captured by an image input device. These images are color corrected, using the image of a gray patch that is visible. A further transform converts the image from a red, green, blue format into a hue, saturation and intensity representation. The two images are then novelly compared on a pixel-by-pixel basis in the hue, saturation and intensity domain.

18 Claims, 11 Drawing Sheets

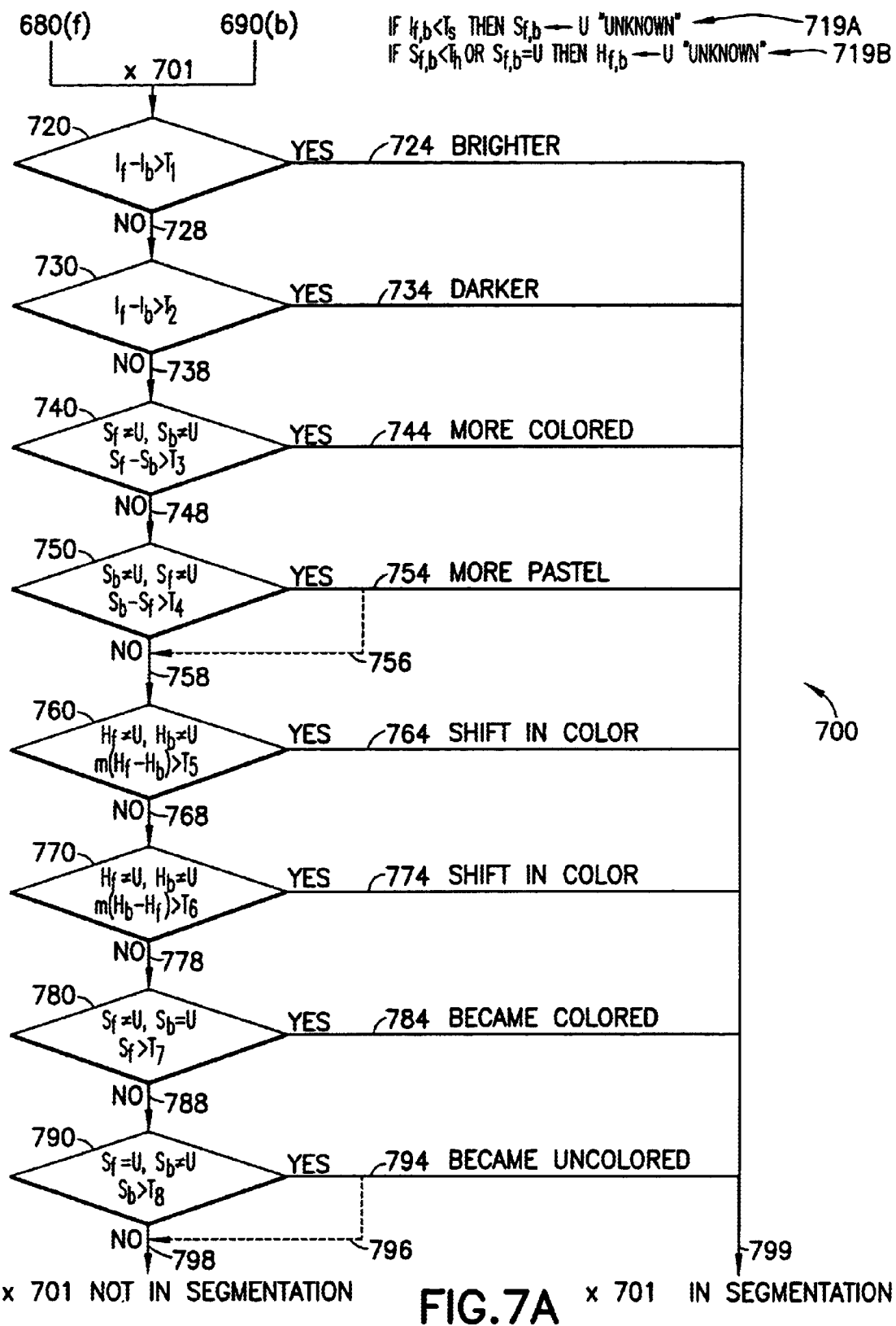

SYSTEM AND METHOD FOR SEGMENTATION OF IMAGES OF OBJECTS THAT ARE OCCLUDED BY A SEMI-TRANSPARENT MATERIAL

FIELD OF THE INVENTION

This invention relates to the field of image processing and computer vision. More specifically, the invention relates to an apparatus and method for taking images of objects independent of the background and/or of the ambient illumination even if these objects are surrounded by plastic that can be somewhat translucent.

BACKGROUND OF THE INVENTION

There are various prior art image processing and computer vision systems which acquire and/or process images of a scene. (Generally, a scene includes a background and one or more objects that are of interest.) Typically, in these systems, an analog image from a camera (image acquisition unit) is converted to a discrete representation by dividing the picture into a fixed number of locations called picture elements, or pixels, and quantizing the brightness or color of the image at those picture elements into a fixed number of values. Usually, color is represented as three different images, the red, the green and the blue image where the color of the pixels is quantized in a fixed number of values. The red, green and blue are referred to as the color channels or the spectral bands. Thus, much of the prior art develops a digital image of the actual image or scene and then processes the digital image using a computer. This processing, also called image processing or computer vision, includes modifying the scene image or obtaining properties from the scene image such as the identity or location of the objects in the scene.

Objects in the scene are illuminated when light falls on the object(s). Ambient illumination is the illumination due to light sources occurring in the environment such as the sun outdoors, room lights indoors, or a combination of artificial light and sunlight indoors. In general, the light reflected from an object patch, resulting in a brightness of the corresponding image pixels, is a mixture of a matte plus a glare (or specular) component, although at a given image pixel either the matte component or the glare component tends to dominate. The color of a matte reflection is a function of the natural color of the object and the color of the illuminating light (in the spectral domain, the illumination function and the reflection function are multiplied). Specular reflections (also called glare) are the bright highlights reflected off the surface of a shiny object. The color of the glare is mostly the color of the illuminating lights (as opposed to the natural color of the object).

The glare component is mostly unrelated to the object's intrinsic surface properties and, therefore, is of little use for object segmentation or recognition purposes. The matte reflection, on the other hand, is a function of the color of the object as well as the illuminating light. To produce a image which is more characteristic of an object's intrinsic color it is desirable to remove or suppress the specular component of reflection. One way to do this is by the use of polarizers. Because of diffusion in the surface layer of an object, matte reflection is not polarized. Specular reflection, on the other hand, is often polarized, especially as the viewing angle becomes more tangential to the surface. Thus adding a properly oriented polarizing filter to the camera will remove a certain portion of the glare. If all the illumination can be controlled, even better results can be obtained by deliberately polarizing the outgoing, illuminating light and then only sensing returned light with an altered polarization angle.

For these reasons an object's color, an important object property for object recognition, depends on the ambient light. In order to compensate for this effect, prior art solutions use the reflection of a white or gray patch in the scene. Color correction is then performed by transforming the image so that the color of the gray patch is transformed to a standard predetermined value. For instance, the patch image color spectrum could be transformed such that the spectrum of the patch image is uniform in the red, green and blue channels (spectral bands) and has a certain, preset reflectance. Indeed, the whole image including the object image is transformed in such a fashion. A representation of the object's color is thus represented for recognition purposes by its image color spectrum normalized by the standard color spectrum of the image of the gray patch. Such techniques, known as color constancy, are well known. An early example for gray scale images can be found in U.S. Pat. No. 4,314,281 to Wiggens and Elie, which is hereby incorporated by reference in its entirety.

Now consider the case where the object to be recognized is surrounded by a plastic bag. It is assumed that the transparency of the bag is high enough that a human can recognize the object. A part of the scene image (e.g., where the bag is flat) contains object image portions as would be seen as if there were no surrounding bag. However, even for those image parts the illuminating light passes through the bag then the reflected light passes through the bag again. Thus the color of the reflected light by any subtle tint to the bag, as well as by the bag's intrinsic diffuse reflectance properties is influenced to an extent depending on the level of translucency and tint of the bag. Other parts of the bag may completely obscure the underlying object image due to specular reflection off the bag surface and, to a lesser extent, due to fact that the bag is seen as opaque depending on the surface normal of the bag or folds in the bag. These phenomena make it difficult to gauge the true surface properties of an item enclosed by a bag.

During the image processing of the scene, the object (or objects) that is (are) of interest is (are) imaged along with the scene surroundings. These surroundings are called the background. The background is usually behind the object(s) of interest. In some types of image processing, it is necessary to separate the object(s) image from the background image of the scene. This separation is called figure/ground separation or segmentation. In such applications it is important that the segmented foreground portion accurately represents the properties of the object to be identified, and not be contaminated by illumination or other environmental artifacts.

This figure/ground separation is most often performed for the purposes of object recognition. U.S. Pat. No. 5,546,475 to Bolle et al. gives an example, where in combination with the segmentation techniques of U.S. Pat. No. 5,631,976 to Bolle et al., the object(s) in the segmented image are recognized using color features (in combination with other features). A segmentation of an image, may, therefore, be denoted as a mapping s of pixels (x, y) into some space s, e.g., S: (x, y)→s, where S(x, y) is set to some value X if pixel (x, y) is not a part of the segment, and S(x, y) is set to the original pixel value I(x, y) if (x, y) is part of the segment. An alternate segmentation of an image, could be a mapping (x, y)→{0, 1}, where an image point (x, y) is labeled '1' if (x, y) is part of the segment and '0' otherwise. Other variations are also possible, where s=[0, 1], the membership of pixel (x, y) of the segmentation is expressed as a degree of membership. The set s could also take on a set of n (greater than two) discrete numbers.

Figure/ground separation of some sort is required when using computer vision technology to recognize produce (fruit and vegetables) at the point of sale (POS) in supermarkets and grocery stores. The ability to automatically recognize produce at the checkout counter has many advantages, among which:

There is no need to affix the PLU (price lookup) stickers to the produce.

There is less need for prepackaging the produce, thereby saving solid waste.

The checkout of produce will be speedier because the checkers do not have to recall or lookup the PLU numbers.

Produce inventory control can be done more accurately.

Pricing can be done more consistently and accurately.

Allows more convenient self-checkout by customers.

Sweethearting of produce (checkers giving away produce to friends and family) is harder.

The overall losses (shrinkage) of produce will be reduced.

Typically, such produce items are enclosed in plastic bags by the customer and it is undesirable to require the customer or checker to remove these bags before performing recognition. Similarly, computer vision technology can be used for recognition of other items sold in bulk, such as, bread, candies, etc. which are also usually enclosed by bags and hence present the same problems.

PROBLEMS WITH THE PRIOR ART

Prior art image processing systems cannot easily separate objects of interest from the background of the scene. For example, there are systems which inspect or recognize parts in an assembly line from images of those parts. There are also special effects systems which mix the image of actors with special backgrounds which may be created separately by computers. These systems obtain an image of the object amenable to processing by presenting the object against a background which is readily and simply distinguishable from the object. For instance, part inspection systems may image the parts against a black or white surface (using techniques such as grazing illumination, dark field imaging, or intensity thresholding against a retro-reflective background). Special effects systems usually require the actors to be imaged before a blue or green surface (called "matting", "chroma-keying", "blue screening", or the Ultimatte process). These and other systems will fail if the background is arbitrary and not specially controlled. One such system is the Ultimatte system as described in U.S. Pat. No. 4,625,231 to Vlahos, which is herein incorporated by reference in its entirety.

Another well-known approach for less-uniform backgrounds is to pixel-wise subtract an image of the background alone from an image containing the background plus an object of interest. General purpose background subtraction methods can be found in D. Ballard and C. Brown, *Computer Vision*, pp. 72–73. Prentice-Hall: New Jersey, 1982.

This reference is incorporated herein in its entirety. Image processing and computer vision techniques for background subtraction rely on methods that somehow derive the background image from the original image. One sophisticated background model is to use a temporal low-pass variant of the original image constructed from an unlabelled sequence of images. In the current (POS) application, however, the system has access to images, Fb, of the background acquired when the objects surrounded by the plastic bag are not in the camera's field of view. The simplest method for background subtraction is then, Fn=F−Fb, where F is the original image. However, this simple method has a number of problems. For those pixels x where there is only plastic bag visible, F(x) is not equal to Fb(x) so these pixels would be counted as foreground. Yet the most informative foreground image, Fn, should only contain pixels corresponding to the object.

Also, some prior art systems have difficulty determining object properties in varying ambient light. For example, many image processing and computer vision systems work by measuring the color or intensity in the image. These color and intensity measurements depend critically on the light illuminating the imaged object and may fail if the object is presented in different ambient light. For these systems the usual solution is to enclose the object in a specially lighted chamber, or carefully control all the lights in the space where the image is taken (i.e., all the lights on the factory floor or in the studio).

Glare reflected from shiny surfaces also presents problems that are difficult to solve for many prior art image processing systems, especially glare from metallic industrial parts. Image processing and computer vision systems have difficulty imaging shiny surfaces such as glass plates or metallic objects due to the glare generated by light reflecting off these shiny surfaces. This is because glare reflected into the imaging systems obscures the object, masks certain surface features, or is interpreted as an intentional mark. In such circumstances, a segmentation system will often falsely omit part of the object due to these highlights.

Prior art segmentation techniques fail on images of objects that are surrounded by plastic bags, primarily because they mark all of the bag as foreground. The above described artifacts introduced by the bag's light transmission and light reflection properties severely impair the segmentation techniques. As discussed above, parts of the object image are simply obscured due to the specular reflection of the bag. This results in regions that contain holes, assuming the specular regions are detected as not being part of the object and removed. While this might be good for surface properties, it can severely distort the overall shape of an object. Furthermore, parts of the object boundaries can also obscured by these specular reflections, which typically results in false and wobbly boundaries when using prior art boundary finding techniques.

There are also other imaging artifacts due to the surrounding plastic bag that impair object recognition. Not all of these directly affect segmentation. One effect is the introduction of false image texture because of two causes: the scattered pattern of specular patches, and the fact that light transmission properties of the bag vary over its surface. The resultant object image is the true object image multiplied by a varying attenuation function plus a nonlinear function that represents the bag's specularity. There is also a subtle imaging effect due to increased inter-reflection. After the illuminating light enters the plastic bag it may then bounce around between the inner surface of the plastic bag and the object surfaces. This means that in local areas of the image the true illuminant is composed of not only the ambient sources, but also the photons reflected from nearby colored surfaces (the "buttercup" effect). Effectively, the color of the illuminating light has changed locally and, hence, the color of the light reflected from the object changes.

U.S. Pat. No. 5,631,976 to Bolle et al. proposes a method and apparatus for segmenting images of an object into object image and background image by controlling a light source to illuminate the object so that the light is brighter in one scene image than in another scene image. The method also considers objects that are surrounded by plastic bags that may be somewhat translucent. However, this system achieves color constancy by enclosing the image input device and the light source in an opaque box with an opening through which the input device can view and the light can illuminate the object. This largely eliminates the effects of ambient light, but that means it is generally not possible to retrofit existing installations due to the large size of the box and other geometric constraints. Furthermore, customers and operators may find the flashing light distracting.

OBJECTS OF THE INVENTION

Therefore a first object of the present invention is an improved apparatus and method for imaging objects independently and separately of the background.

A further object of this invention is an improved apparatus and method for imaging and segmenting objects independent of background, ambient illumination and glare.

Another object of this invention is an improved apparatus and method for imaging and segmenting objects independent of background, ambient illumination, glare and other imaging artifacts due to a surrounding plastic bag.

SUMMARY OF THE INVENTION

This invention describes a system and method for segmenting an object image from a background image. The image processing for segmentation, novelly handles images that are acquired when the scene is illuminated by unknown ambient light sources. Hence, no special illumination of the scene is required. An image of the scene containing the object of interest plus a separate image of the background scene are captured by an image input device. These images are first color corrected, using the image of a gray patch that is visible in the images, so that the gray patch in both images has some standard gray value. A further (prior art) transform converts the images from red, green, blue formats into a hue, saturation and intensity representations. The two images are then compared on a pixel-by-pixel basis in the hue, saturation and intensity domain. For this, there is a sequence of specific tests to be performed on the HSI values of a pixel in the foreground image in order to compare them to the HSI values of the same pixel in the background image. These tests determine whether an image pixel is a foreground pixel or not. Further tests are executed for the special case where the scene object is surrounded by a plastic bag.

BRIEF DESCRIPTION OF THE DRAWINGS

The foregoing and other objects, aspects and advantages will be better understood from the following detailed description of a preferred embodiment of the invention with reference to the drawings, in which:

FIG. 7A gives a flow diagram of the conditions of the HSI values for foreground pixel selection.

DETAILED DESCRIPTION OF THE INVENTION

Figure 1:
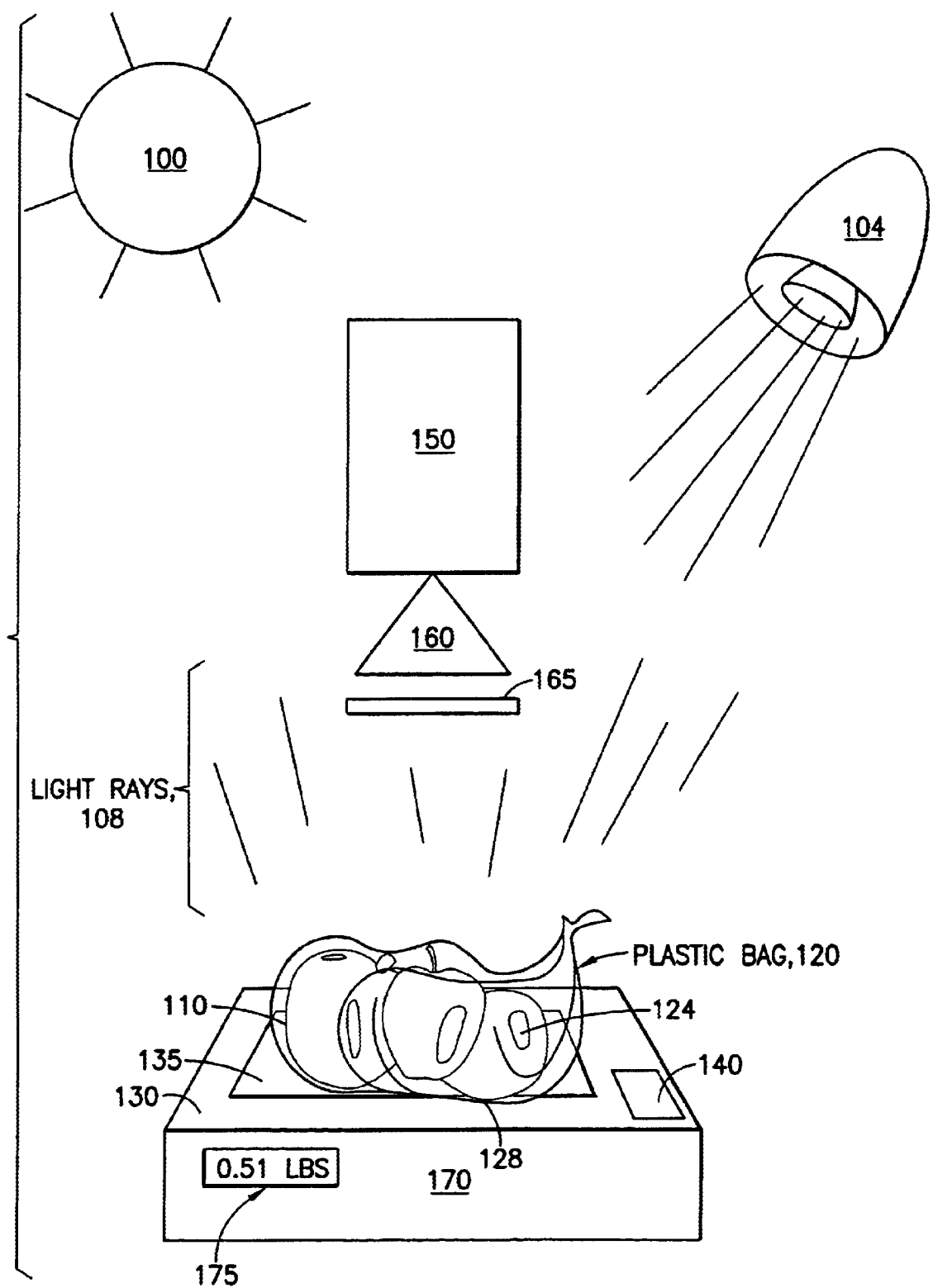
FIG. 1 is a drawing showing a preferred setup for imaging objects in ambient light.

Referring now to the drawings, and more particularly to FIG. 1, there is shown a preferred object imaging setup for ambient light. The ambient light can be a combination of natural fight 100 and artificial light 104. Natural light may be sunlight, blue skylight, diffuse overcast skylight, greenish reflection off vegetation or any combination thereof The artificial fight may be a fluorescent fight, halogen light, incandescent light, or any combination thereof The object(s) 110 that are to be imaged, therefore, are illuminated by a combination 108 of one or more, typically many, possible sources of light.

Figure 3:
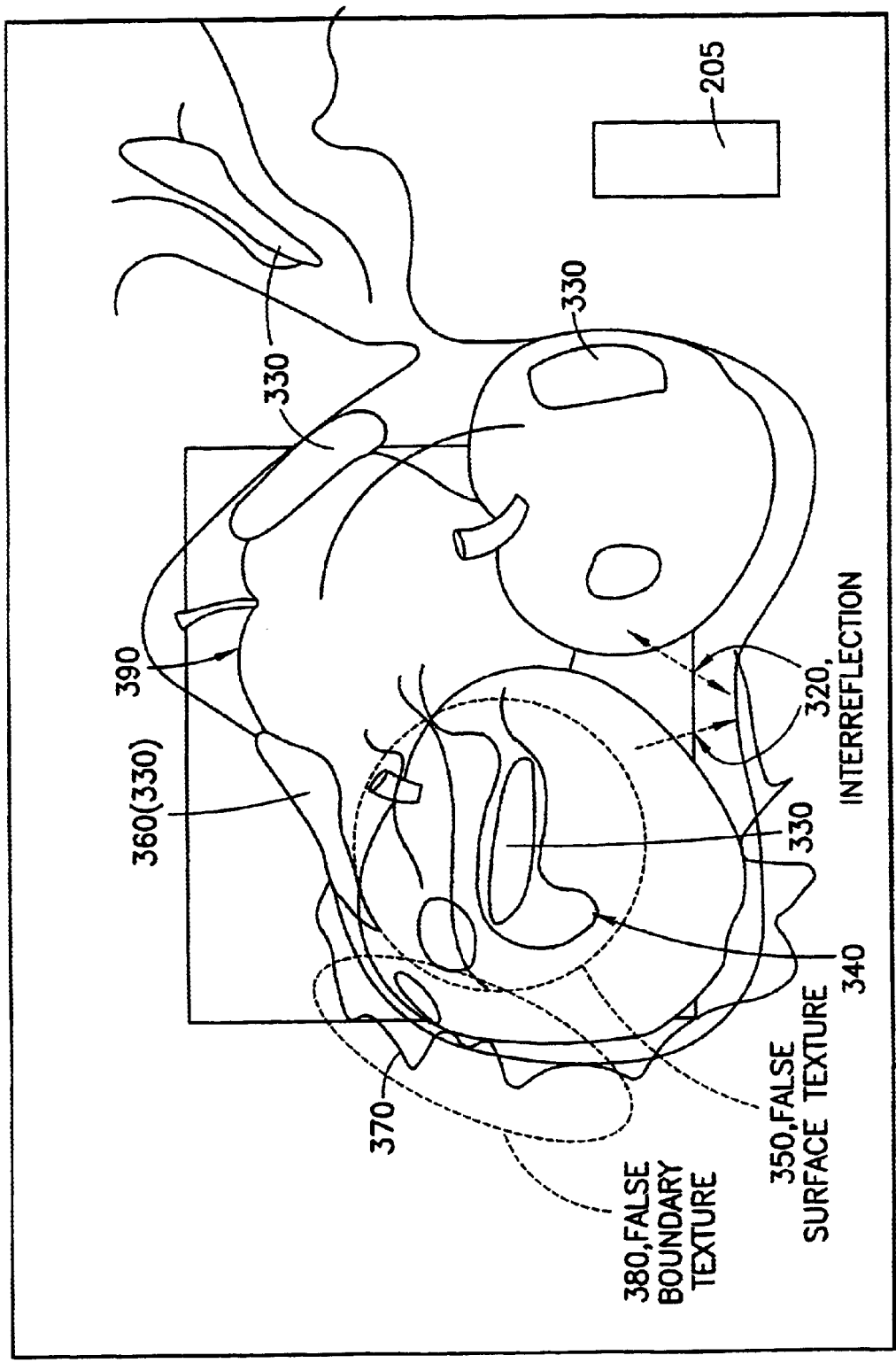
FIG. 3 is a typical output image showing the various imaging artifacts.

The object(s) 110 may be surrounded by a plastic bag 120 which introduces a number of artifacts in the appearance of the objects, including specular reflections 124 from the surrounding plastic bag and boundaries 128 that are not quite the boundaries of the objects. FIG. 3 will more exhaustively describe these artifacts.

The objects are imaged against a background 130 that may not be homogeneous and may contain marking 135 that themselves are specular. A small patch 140, preferably of a shade of light gray, is affixed to the background. The image of the patch is used to normalize the colors in the image so that the color (gray value) of the patch 140 is some standard predetermined value (see FIG. 6).

The objects are imaged by camera (image acquisition unit) 150. The lens 160 of the camera optionally has a linear polarizing filter 165 attached. In this figure, the objects are produce items (fruits and vegetables) to be recognized in a grocery store, for example, at the Point Of Sale (POS). The objects are therefore situated on a scanner-scale 170, which measures the weight 175 of the objects. While this is a preferred embodiment for a grocery store installation, any general imaging system is envisioned.

Figure 2:
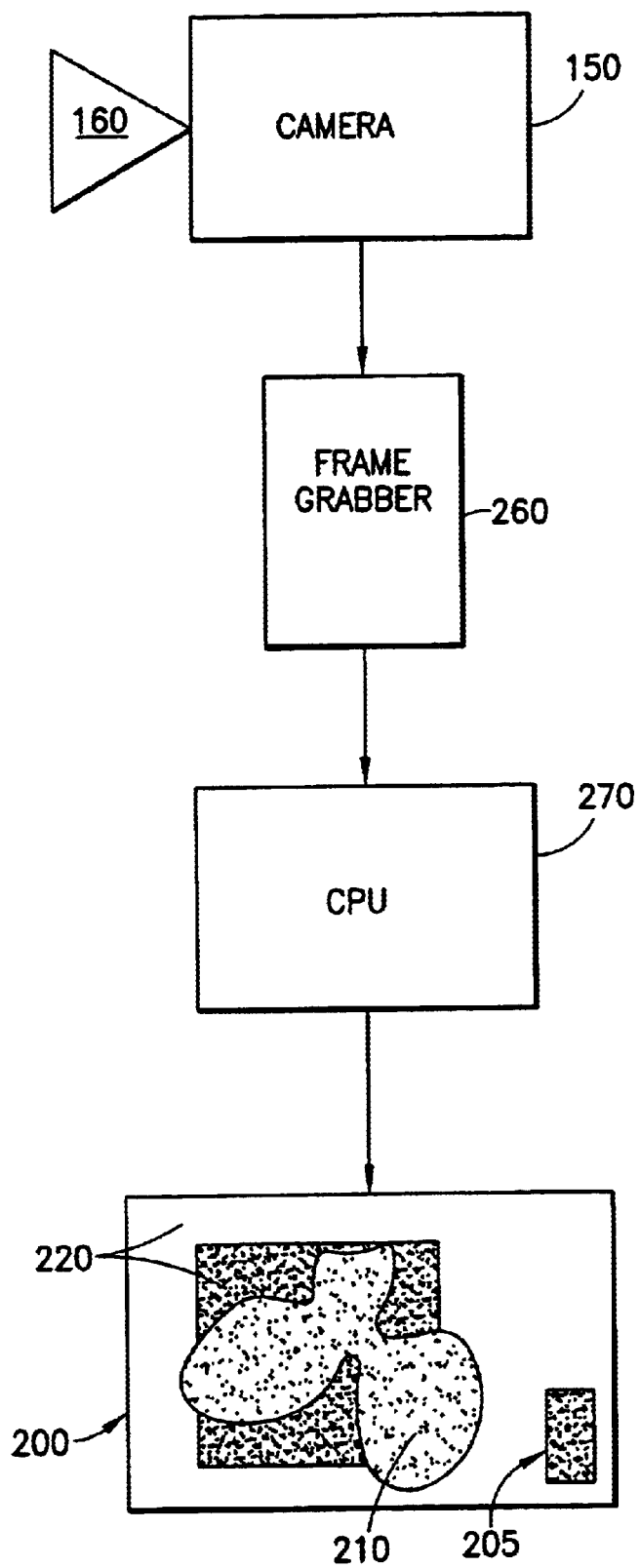
FIG. 2 is a flow diagram of the object segmentation system.

FIG. 2 is a flow diagram of the object segmentation system. It shows the image acquisition unit 150 with lens 160 which is used for imaging the objects 110. The image acquired by camera 150 is digitized into a fixed number of pixels, each quantized into a fixed number color intensity values by frame grabber 260. This image is then processed by computing device (central processing unit, CPU) 270 to develop a segmented image 200. This image contains a segmented image 210 of the objects 110 with background image 220. Additionally this background image contains the image 205 of calibration patch 140.

Referring now to FIG. 3. This figure shows a typical output image 300 of the camera 150 with the background image and patch image 205 in the bottom-right. This figure illustrates various imaging artifacts. The objects 110 are surrounded by plastic bag. The resulting image is an image of the objects 110 somewhat obscured by the bag because of the bag opaqueness. That is, the colors are less saturated and the hue of the object image is affected by the slight coloring of the surrounding bag. Moreover, the color of the object image 310 is affected by inter-reflection 320 of light rays within the plastic bag and between object surfaces.

The bag surface normal varies within the image of the object surrounded by the bag, due to bag surface height variation and folds 340. This introduces specular reflections 330 over the object image (and in the background portion of the image). These specularities are so bright that in these areas most object surface information is lost. In combination with the relative opacity of surface creases 340, the specular reflections form large areas 350 in the image where the image texture of the objects surrounded by plastic bag is a combination of the true object texture and the bag texture.

There are also areas 360 in image 300 where the true object boundaries are completely obscured by specular reflection patches. Additionally, folds in the envelope of the plastic bag 370 can introduce wobbly boundaries in areas such as 380 in the image. Furthermore, specular areas like 360 obscure, and areas like 380 distort, the true surface textures and the true limbs of objects 110. They can also introduce false object boundaries, such as 360, and false textured boundaries within 370. The overall effect is that there is a loss of information about the true object limbs, such as 390, and true surface texture in these regions. A number of these artifacts are removed or ameliorated by later stages of processing.

Figure 4:
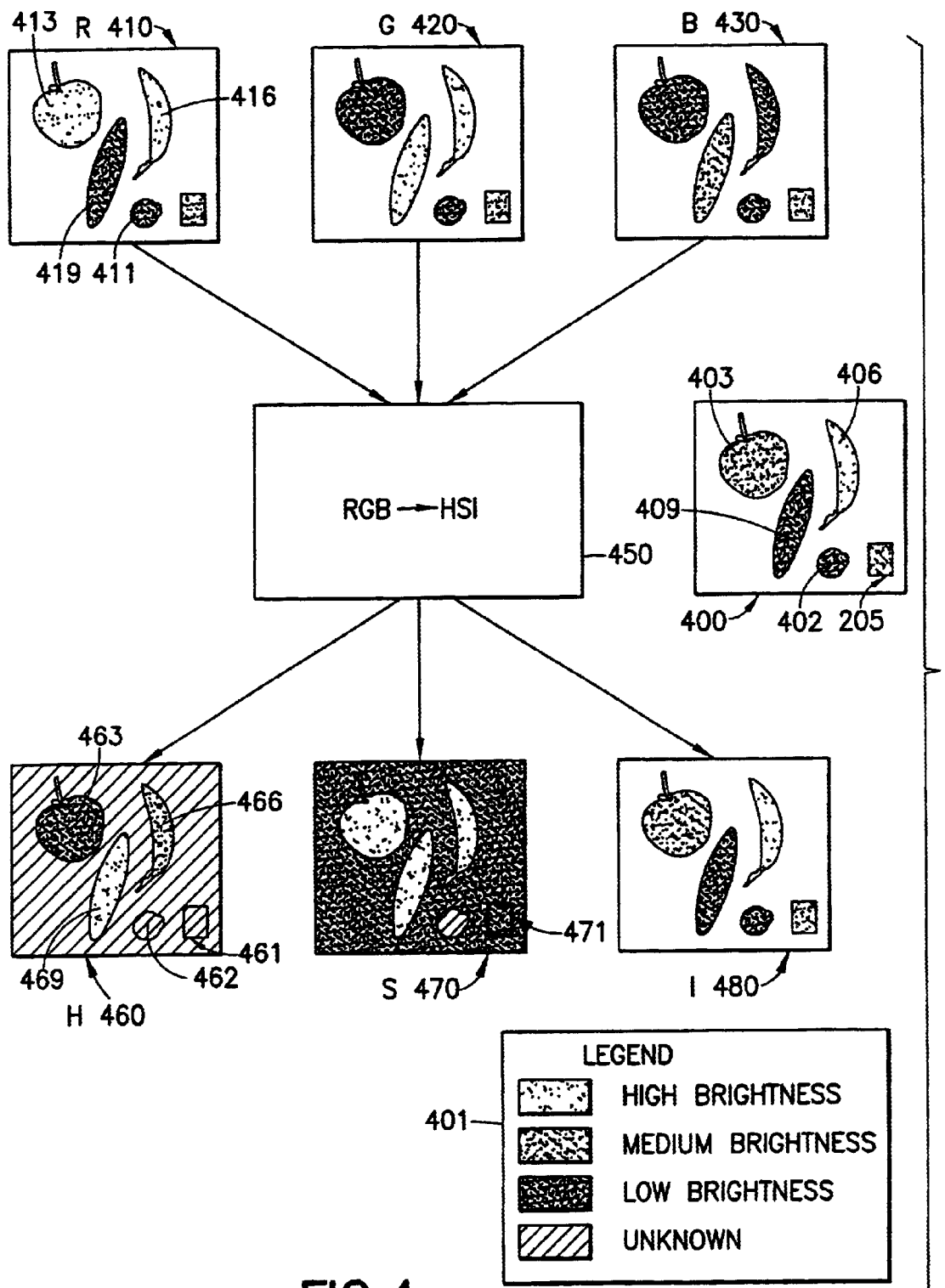
FIG. 4 shows how an input image composed of red, green and blue images is transformed into hue, saturation and intensity images.

The transformation from RGB color space to HSI color space is a well-known prior art technique. FIG. 4 details how an input image composed of three spectral bands—the red, green, and blue images (RGB)—is transformed into hue, saturation, and intensity images (HSI). Understanding of this transform is useful for the understanding of the rest of this invention. Image 400 depicts the color output image of camera 150. The image contains a red apple 403, a yellow banana 406, a green cucumber 409, and a black olive 402; it also contains color calibration patch 205. All of these are against a white background. The image is depicted across the top of the figure as three scalar-valued color channels, where the gray-scale reflectance image can be computed as a weighted sum of the red 410, green 420 and blue 430 channels. The result is that the banana image 406 is seen as bright, the apple image 403 as medium bright, and the cucumber 409 and olive 411 are dark. These (quantized) reflectance levels are displayed in legend 401.

Following this legend, in the red spectral band 410 the apple appears bright 413, the banana also appears bright 416 because yellow surfaces reflect red and green light, but the cucumber and olive are dark 419, 411 because no red light is reflected from the dark green and dark black surfaces. Similarly, in the green spectral band 420 the red apple reflects low amounts of green light and is dark, the banana reflects high amounts of green light (yellow surfaces reflect both red and green light), and the cucumber obviously also reflects a high amount of green light. Thus, the banana and cucumber appear bright in the green spectral band. The blue spectral band 430 is similarly explained. The apple reflects no blue light, the banana reflects no blue light either (yellow is the opposite of blue) and the cucumber reflects some blue. Hence, the apple and banana appear dark and the cucumber appears medium bright. The olive, being almost purely black, shows up as dark in all three spectral bands.

These three channels are transformed into hue 460, saturation 470 and intensity 480 images through a transform 450. Intensity image 480 is the result of a sum of the color images 410, 420 and 430 and, therefore, its appearance is equal to image 400, the color image depicted as a gray-scale image. The intensity value at each pixel indicates the (possibly weighted) average response across all spectral bands.

Image 470 shows the derived saturation image. The saturation of an HSI image indicates how vivid the color in the corresponding area is. For example, when there has been a lot of rain, the color of the lawn is highly saturated green while in periods of lesser rain, the color becomes less saturated (more pastel). Another example is the difference between red (high saturation) and pink (low saturation) and white (zero saturation). Saturation is undefined for pure black areas, and unstable for areas nearing pure black. The saturation of gray patch 205 in image 470 is thus zero 471, as is the saturation of the white background. The black olive, on the other hand, has saturation which is undefined. For all the rest of the fruits in image 400, however, the saturation is high. This is basically the case because the color of all produce is pretty clear and crisp. Hence the fruits in image 470 have high saturation values and therefore are seen as bright.

The hue image 460, finally, indicates what the color of the various objects in a scene are. Hue can be defined on the scale [0, 255], where 0 equals to deep red, 85 a deep green, and 171 a deep blue. A hue value of 255 is nearly identical to 0 because hue is cyclical (sometimes a different scale is used with hue ranging from 0 degrees to 360 degrees). Hue for shades of pure gray (including white and black at the extremes) is not defined, and in areas of low saturation it is unstable. Therefore the hue of gray patch 205 is indicted by a cross-hatch pattern 461, as is the hue of the white background. Since even a stable saturation value could not be compute for the black olive, its hue is also undefined 462. For the more colorful items, in hue image 460 the apple is seen as a dark object 463 (a low hue value corresponding to a red color), the banana as a medium bright object 466 (medium hue=yellow color) and the cucumber as a bright object 469 (high hue=green color).

Hue and saturation are useful features because they are independent of the level of illumination in a scene. Taken together, the hue and saturation define the relative reflectance in the red, green and blue spectral bands. The purpose of the HSI transform is to decompose the response at each pixel to isolate the light intensity component from the more intrinsic and invariant hue and saturation components. If desired, the absolute red, green and blue responses can be recovered by multiplying the relative reflectances by the intensity component.

The HSI color space is used in a preferred embodiment of the present invention. This prior art transform can be found in D. Ballard and C. Brown, *Computer Vision*, Pages 31–35. Prentice-Hall: New Jersey, 1982.

This reference is incorporated herein in its entirety.

Other color spaces that may be used are those defined by the CIE (Commission Internationale de l'Eclairage—the International Committee for Illumination). These spaces are CIE L*u*v* hue angle and saturation and CIE L*a*v* hue angle and saturation. Ratios of color components such as the red response divided by the green response (after appropriate gamma correction) also yield intensity independent color measures. Another popular method is to divide each response by the average response across all spectral bands, such as Rn=R/(R+G+B), to produce a set of fractional color components (which sum to one).

Figure 5:
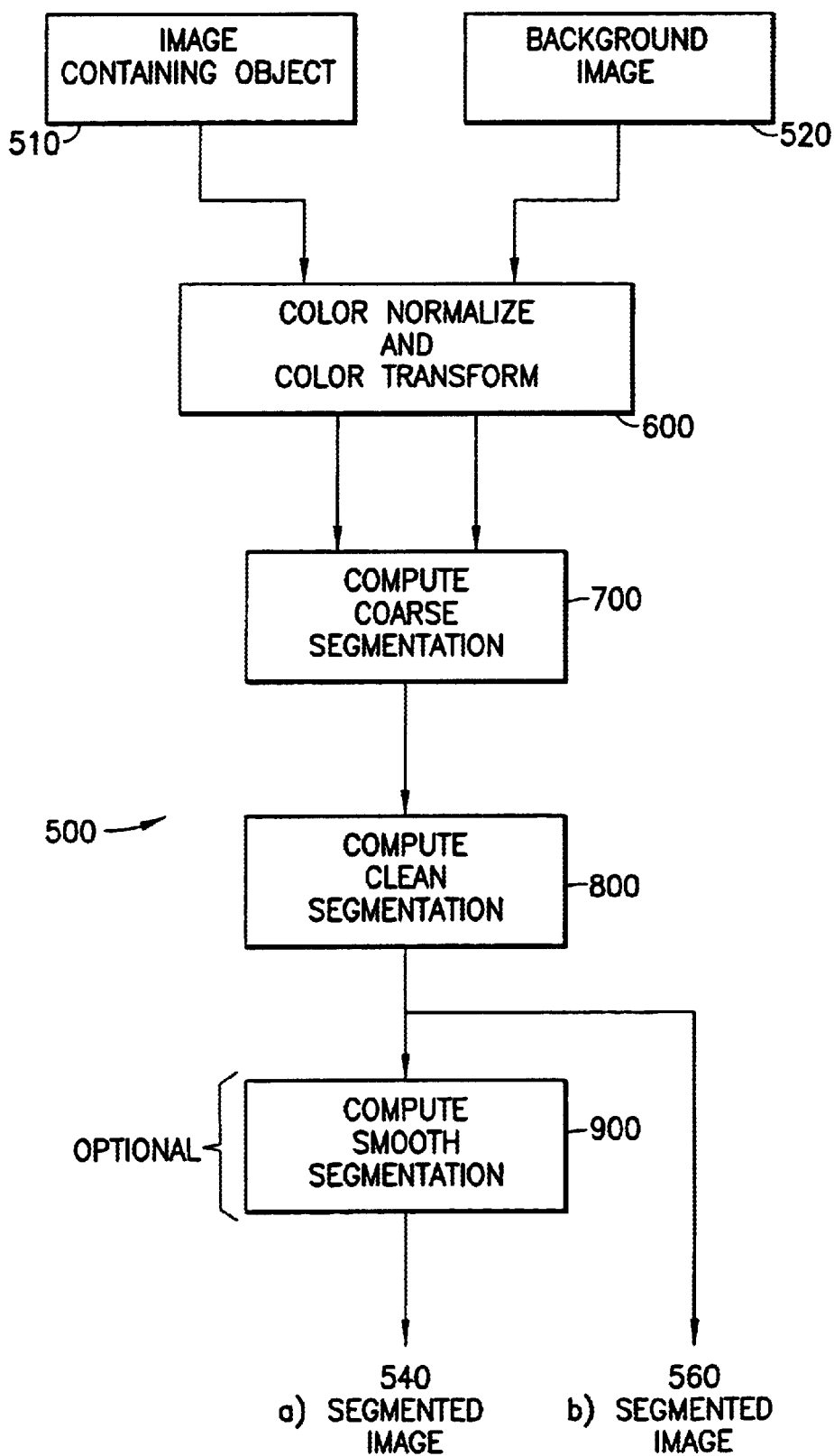
FIG. 5 is a complete flow diagram of the process for segmenting the object image from the background image.

Moving on to FIG. 5, here is shown a flow diagram of the process 500 for segmenting the object 110 image from the background image. The resulting output image of this process is either a clean segmented image 540, or a clean and smoothed segmented image 560. FIG. 5 enumerates the various steps of the process of segmenting the object from the image 510 that contains the object and portions of the background (a combined image). Process 500 requires two input images to function. The first is an image 520 of just the background 130. The other is an image 510 of the objects 110 in a bag 120 on top of this background 130. Both images are acquired by camera 150 and contain the color calibration patch 140.

The first step in this process, is color calibration (normalization) 600 of the images (510 and 520) so that the color of the patch image 205 is unsaturated (gray) and the same intensity in both images. The normalized images are then transformed from RGB space (the spectral bands) to HSI space using the prior art transform described in FIG. 4. Step 600 is further described in conjunction with FIG. 6. These normalized and transformed images are then input to the background subtraction process 700, which develops a coarse segmentation. This novel process (described further in FIG. 7) is performed in HSI space as opposed to most of the prior art processes that operate in RGB space or other color spaces. The output of background subtraction step 700 is a coarse segmentation of the object image that still contains some artifacts due to the plastic bag 120.

Figure 8:
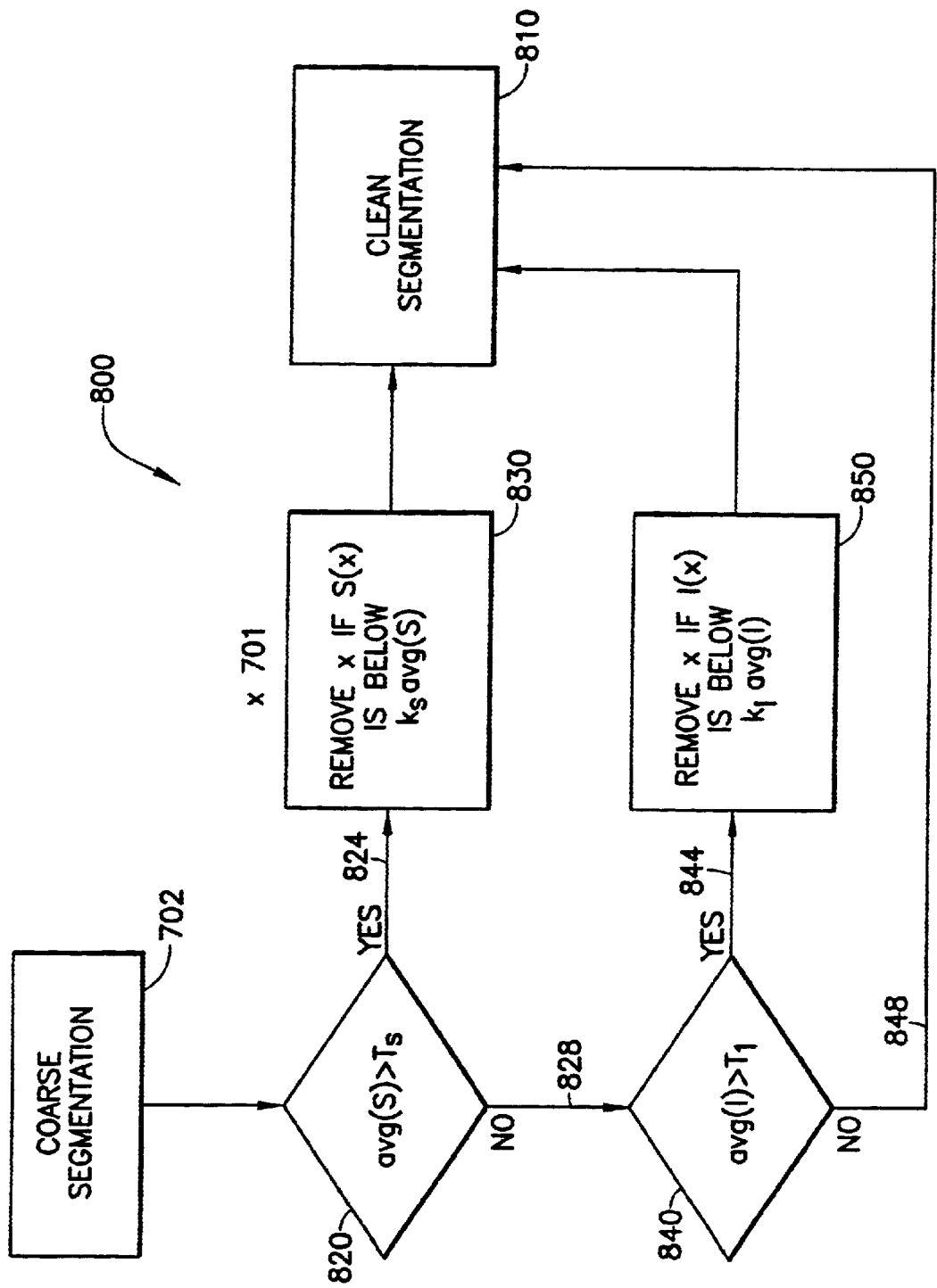
FIG. 8 shows the process of removing unusable image patches from the difference region to obtain a segmented image.

A further process 800 takes this coarse segmentation as input and computes a clean segmentation by removing as many of bag artifacts as possible (described in relation to FIG. 8). This clean segmentation may still have ragged edges, holes and disconnected pieces. An optional post-processing step 900 massages the clean segmentation to derive a smooth segmentation (see the description of FIG. 9). The output segmentation of process 500 is then either the smooth segmentation 540 (output of 900) or, alternatively, just the clean segmentation 560 (the output of 800).

Figure 6:
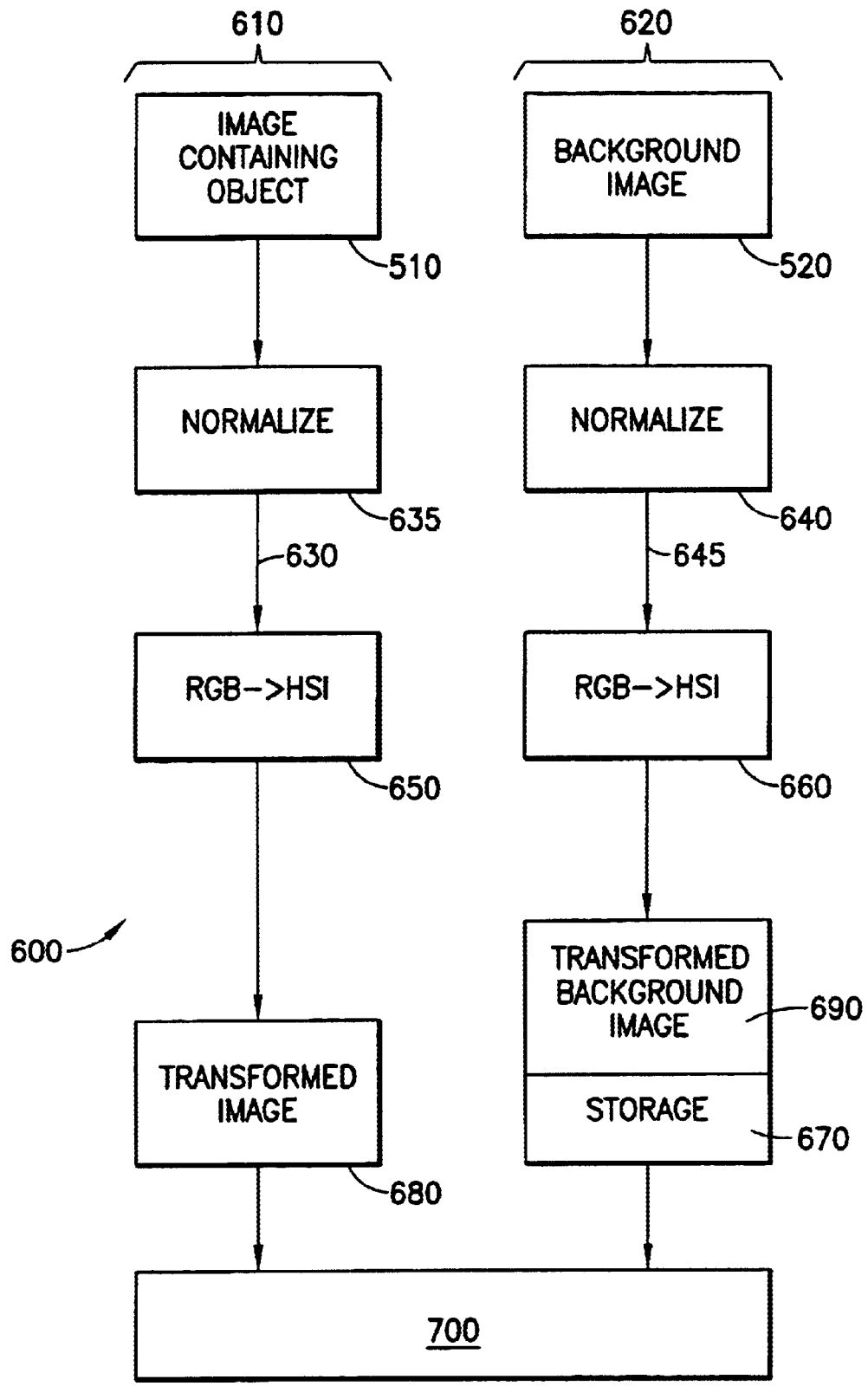
FIG. 6 shows the process of color normalization and transform of the red, green, and blue channels (spectral bands) into hue, saturation, and intensity (HSI) for both the input and a background image.

We turn our attention now to FIG. 6 which is a detailed description of step 600 in FIG. 5. The flow diagram 600 shows first the process of color normalization 630 of input image 510 containing the object, and a similar normalization 640 of background image 520. This is followed by a transformation 650 (and 660) of the red, green, and blue channels of these images 635 (and 645) into hue, saturation, and intensity. The output image of the entire process 610 (the left hand column) is an image 680 transformed from input image 5 10 (with object 110). The output image of process 620 (right hand column) is a background image 690 transformed from input background image 520. In practice, this normalized background HSI image 690 is usually acquired once, and stored 670 in some memory for use in later computations.

The purpose of the color normalization steps 630 and 640 is to transform the appearance of color calibration patch 140 in the image 510 and in the image 520, respectively, to the same standard, predetermined monochromatic value. Such a transformation is described by transforming an RGB color vector into a new RGB color vector $$[R'G'B']^t = [F_r, F_g, F_b][RGB]^t$$

where superscript t denotes transpose. The vector [R G B] contains the RGB values in the original image spectral bands (image 510 or 520) and the vector [R'G'B'] contains the RGB values in the corrected image spectral bands (output normalized image 635 or 645). The factors $F_r$, $F_g$, and $F_b$ are the transform factors of the red (R), green (G), and blue (B) spectral bands in the input image, to obtain the red (R'), green (G'), and blue (B') spectral bands in the output image. These transformation factors are, in general, different for color normalizing the image 510 and color normalizing the image 520. The standard monochromatic value vector [R'G'B'] in the preferred embodiment is [180 180 180]. As a result of this correction, those portions of the background that are visible in the image 635 will have the same color as in image 645. This causes the background subtraction described in FIG. 7 to yield approximately zero in those areas.

If camera 150 has fixed white balance (no automatic white balance or AWB), a fixed aperture and exposure, and automatic gain control (AGC) is disabled, the color transformation is trivially the identity vector ($F_r=F_g=F_b=1$) or a uniform intensity scaling factor.

Generally, the gray patch will appear in the same place in both the background and foreground (combined) image. This makes it easy to determine which pixels correspond to each other and thus form the basis of the image normalization function. In certain cases, however, the gray patch may be partially occluded by the foreground objects. If all the pixels normally associated with the position of the patch were used, the color of the occluding object could undesirably skew the image normalization. However, if the approximate RGB response of the gray patch is known, then the unoccluded portion of this region can be determined by looking exclusively for pixels with responses in the proper range. It is also possible that in some implementations the gray reference patch may appear at different places in the two images. However, using the same approach, the patch could be found in each image by looking for regions with this known response. To enhance reliability, the found regions might be further required to meet certain size, shape, and/or orientation constraints related to the known geometry and placement of the patch before being used for normalization.

The RGB to HSI color transforms of steps 650 and 660 are the prior art transform of the red R(x), green G(x) and blue B(x) values of every pixel $x=(x_1, x_2)$ as described in FIG. 4. This transform is given by the three functions:

H(x) = $F_h$( R(x), G(x), B(x))
 = 255/360 * atan(sqrt(3) * (G(x) − B(x))/(2 * R(x) − G(x) − B(x)))
S(x) = $F_s$( R(x), G(x), B(x))
 = 255 * (1 − min(R(x), G(x), B(x))/I(x))
I(x) = $F_i$( R(x), G(x), B(x))
 = (R(x) + G(x) + B(x))/3

The input color spectral band values (R(x), G(x), and B(x)) are assumed to be in the range 0 to 255. Applying this transform to the images 635 and 645 gives the transformed input object image 680 and the transformed background image 690, respectively.

The transformed image of the background 690 may be recomputed from time to time, e.g. every time an image 510 is acquired or at fixed time intervals. The image may also be developed only one time. Or it may be created once then updated over time by averaging it with newer normalized images. Since the same camera will typically be used to take the image containing the object, this normalized HSI background image is stored 670 in memory for later use. The transformed image 680 and the (stored) background image 690 form the input to the next step, process 700.

Figure 7:
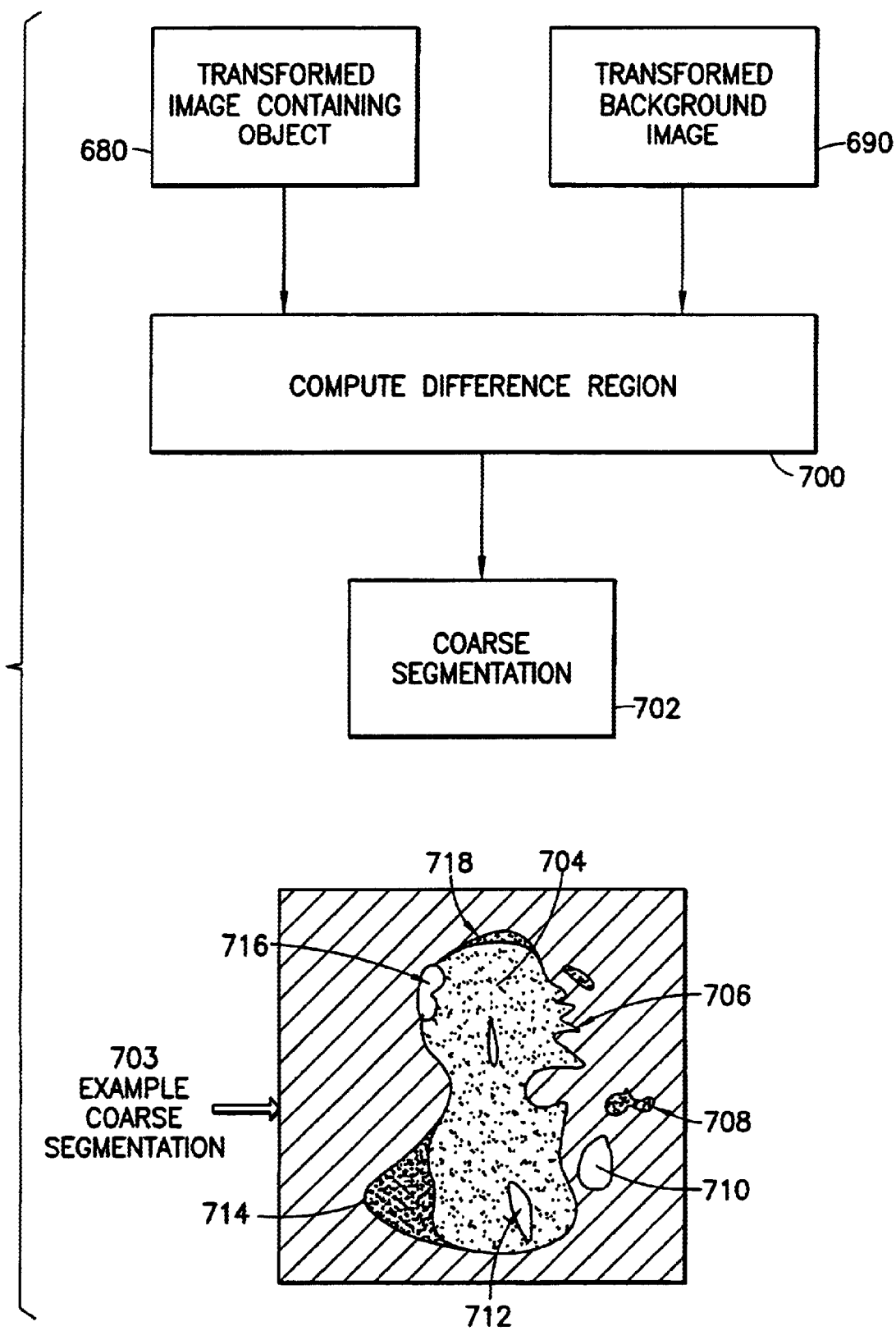
FIG. 7 gives a simple block diagram of the background subtraction process resulting in a coarse segmentation and shows an example output image.

Refer now to the description of process 700 in FIG. 7. This shows a simple block diagram of the background subtraction process resulting in coarse segmentation 702, and also an example of such a coarse segmentation output image 703. The process for computing the difference region 700 (see also FIG. 5) takes as input the transformed image containing an object 680 and the transformed image of the background 690. The process 700 is a novel general purpose technique for image subtraction with reference to a background image, assuming normalized and transformed images. The process is designed for any object 110, not just for objects surrounded by plastic bags. A more specific description of the steps of 700 will be deferred until the discussion of FIG. 7A.

The result of process 700 is a coarse segmentation image 703, as shown near the bottom of FIG. 7. This image typically has a main segment 704 and minor segments such as 710. Here the segmented image may be denoted as $S(x)=S(x_1, x_2)$. To indicate that x is definitely not an element of the foreground segment, $S(x)$ may be set to 0. Similarly, to include x in the foreground one could set $S(x)=1$. However, there are several other possibilities as well such as setting $S(x)=A$, with A an element of a finite set $\{a_1, \ldots, a_n=1\}$ or A an element of $(0,1]$. In the latter cases, the $S(x)$ value denotes the degree of certainty that x is a member of segment S. These type of segment indicators are useful for smoothing the segmentation. This is described later in process 900, FIG. 9. Yet, a third way to mark the foreground region is to set $S(x)=C(x)$ for the foreground, where C is the (color) vector function that expresses the HSI at x, and [0 0 0] elsewhere. This produces an HSI image where the background segment is uniformly zero at all locations.

For the coarse segmentation output image 703, segment 704 is displayed is terms of a scalar membership value $C(x)$ (a one-dimensional function in this case): black, medium bright, bright and white. The diagonally striped portion of 703 indicates those pixels that are not a member of the segmentation. This image further contains a large segment 704 plus small regions of segment area such as image chunks 708 and 710 outside the main segment 704. It also may contain areas (e.g., 712) in the segment area 704 that are white because of specular reflecting surface patches of the plastic bag. The boundary of segment may be wiggly at places like 706 as an artifact of the surrounding plastic bag. Finally, the true boundary may be affected because at other places the boundary has been obscured by specular reflections off the plastic bag (e.g., 716).

Suppose the object of segmentation 703 is green. If areas 714 and 708 correspond to just the bag, then their saturation (colorfulness) will typically be significantly lower than the saturation of areas 704 and 710. This is caused by the fact that the bag is milky and picks up only a little (if any) of the reflected color of the object, making it a light pastel green. If the area 718 is shadow, it will typically be much darker than the bulk of region 704. Both these type of segmentation artifacts are handled by the process 800 in FIG. 8 which removes such regions.

Now consider FIG. 7A. This details a flow diagram of step 700 in FIG. 7 (also step 700 of FIG. 5) showing what conditions are used for classifying a pixel $x=(x_1, x_2)$ 701 as foreground or background. The HSI values of pixel x in transformed image containing the object 680($f$) (foreground image) and the HSI values of pixel x in transformed background image 690($b$) are systematically compared. We denote the HSI values of foreground pixel x 701 by $H_f$, $S_f$, and $I_f$, and the HSI values of background pixel x 701 by $H_b$, $S_b$, and $I_b$, respectively. The RGB into HSI transform described in FIG. 4 is helpful in explaining the details of this figure.

A first set of tests is performed to examine pixels x on an individual basis for validity of the saturation and hue value. In test 719A, if $I_f$ or $I_b$ is less than some small threshold $T_s$, the saturation $S_f$ or $S_b$ (respectively) of the pixel 701 is set to some value U, indicating that the saturation is not defined ("unknown") because the corresponding pixel intensity value is too small for the saturation estimate to be numerically stable. A preferred value for $T_s$ is 20 (out of 255 maximum).

Similarly, in test 719B, if $S_f$ or $S_b$ is less than a second small threshold $T_h$ then the corresponding hue $H_f$ or $H_b$ is set to U, indicating that the hue of a low saturation color is not stable ("unknown"). A preferred value for $T_h$ is 25 (out of 255 maximum). If $S_f$ or $S_b$ has been set to U in test 719A the corresponding hue values $H_f$ or $H_b$ are also set to U, because, obviously a pixel 701 of unknown saturation is also of unknown hue. The resulting values are called stabilized HSI values.

A further set of tests of 700, comprising tests 720, 730, ..., 790 are foreground/background decisions, i.e., decisions whether a pixel x 701 is an element of the coarse segmentation 540 or not. These test are based on comparisons of stabilized HSI values of corresponding pixels x in foreground image 680($f$) and background image 690($b$).

Test 720 and 730 (FIG. 7A) are test based solely on the intensity values of pixel x in the foreground and background image. If $I_f - I_b$ is greater than some threshold $T_1$ 724, pixel x is brighter 724 than the corresponding pixel of the background image. This condition clearly indicates that the value of pixel x has changed (from stored background to foreground image) and that x is an element 799 of the coarse segmentation 702. If this is not the case 728, a further test 730 on the intensity values is performed. If $I_b - I_f$ is greater than a second threshold $T_2$ in test 730, this indicates pixel x is darker 734 than the corresponding pixel of the background image. This condition again indicates that the value of pixel x has changed and that x is an element 799 of the coarse segmentation 702. Thresholds $T_1$ and $T_2$ are the same and equal to 100 (out of 255 maximum) in a preferred embodiment. However, to enhance rejection of shadows it might be desired to set $T_2 > T_1$.

If tests 720 and 730 are both not true (728 and 738), a foreground region may sometimes be inferred based on a change in the saturation and/or hue of pixel x. Further tests 740–790 examine this. The tests 740 and 750 (FIG. 7A) are concerned with changes in saturation of the colors of pixel x 701 from the background image to the foreground image. Obviously, to measure this change, the saturation must be defined in both the background image and the foreground image, i.e. we should have $S_f \neq U$ and $S_b \neq U$. Test 740 determines if the saturation of the foreground pixel x is higher (measured by threshold $T_3$) than the saturation of the background pixel x, $S_f - S_b > T_3$, which indicates that foreground pixel x is more colored 744 that background pixel x. This generally indicates that pixel x 701 is in the segmentation 799. Test 750, on the other hand, determines if the saturation of the foreground pixel x is lower (measured by threshold $T_4$) than the saturation of the background pixel x, $S_b - S_f > T_4$, which indicates that foreground pixel x is more pastel 754 that background pixel x. In many situations (depending on the background), a pixel turning more pastel indicates the presence of a bag region, not an object region. Thus, in a preferred embodiment, test 750, a check whether foreground pixel is more pastel than background image pixel (lower saturation), is not used. Hence 748 points directly to the next test 760 or equivalently, 754 becomes 756 and points to test 760. In a preferred embodiment $T_3 = 30$ (out of 255 maximum) and $T_4=256$ (an impossible threshold to achieve, indicating that this test is skipped).

If tests 740 and 750 are not satisfied (748 and 758), the presence of an object may be indicated by the hue of pixel x changing from background to foreground. Here we need $H_f \neq U$ and $H_b \neq U$, i.e., the hue needs to be defined for both pixels. These hue tests are mixed into steps 760 and 770 of FIG. 7A which also check if there is a shift in hue (that is, a shift in color 764 or 774). First, let $m(H_1-H_2)$ denote $(H_1-H_2)$ modulo 180 degrees accounting for the fact that hue is defined as $H=\cos^{-1}\{F(R, G, B)\}$, with $F(R, G, B)$ a nonlinear function of RGB. Test 760 checks if there has been a clockwise shift in color 764 of pixel x from $H_b$ to $H_f$, if $m(H_f-H_b)>T_5$. Test 770 checks if there has been a counter-clockwise shift in color 774 of pixel x from $H_f$ to $H_b$, if $m(H_b-H_f)>T_6$. If one of these tests is true (764 or 774), the pixel x is determined to belong to segmented object image 799. Threshold $T_5$ and $T_6$ are the same and equal to 40 (for hue measured from 0 to 255) in a preferred embodiment.

The final two tests, 780 and 790, check if pixel x became colored 784 or uncolored 794, respectively. The first test (780) determines whether $S_b=U$ while $S_f \neq U$ and moreover $S_f > T_7$ so that pixel x in the background image has undefined saturation, yet foreground pixel x is colored and sufficiently saturated. If this test is true, pixel x became colored 784 and thus is part of the segmentation 799. If the test is not true 788, pixel x is subjected to a final test. For this final test (790), it is necessary that $S_f=U$ while $S_b \neq U$ and $S_b>T_8$. This means that pixel x in the background image at least moderately saturated, while the saturation of pixel x is undefined for the foreground image. If this is true, pixel x became uncolored 794 and is part 799 of the segmented output image 702. In a preferred embodiment, test 790 is not used (equivalently $T_8=256$, which is impossible to achieve) and $T_7=T_h$ (cf. 719B)=25 (out of 255 maximum). If test 790 is not used, the previous transition 788 essentially points straight to conclusion 798. Or, equivalently, both arrows 798 and 794 (shown as alternative form 796) point to the rejection state.

Any pixels that fail all the tests and reach terminus 798 (the rejection state) are not part of the coarse segmentation 702.

Continuing with FIG. 8, here we show a flow diagram 800 (also process 800 in FIG. 5) of some post-processing steps. Process 800 computes a clean segmentation 810 from coarse segmentation 702, the output of the flow diagram 700 of FIG. 7A. Process 800 removes segment areas that are the effect of the plastic bag surrounding the object, hence tests 820 and 840 are specific to objects occluded by a semi-transparent material.

In the first step of process 800 the system computes the global average, avg(I), of the intensity values of the pixels in coarse segmentation (i.e., the foreground region). It similarly computes avg(S), the global average of the saturation values of pixels in the coarse segmentation. Next, in step 820 it checks whether the overall saturation avg(S) is greater than threshold $T_S$. If so (824), then step 830 removes those pixels whose saturation is significantly lower than the average (i.e., $S(x) < k_S \cdot \text{avg}(S)$). This results in clean segmentation 810. This first test removes those regions from the segmentation where the saturation is washed out because of the plastic bag.

For those images where 820 is not true (828), a second test 840 is performed. The system now checks if the image is fairly bright overall (avg(I)>$T_f$). If not, the clean segmentation 810 is identical to the coarse segmentation 702. However, if the test in step 840 returns true (844), step 850 removes any pixels which are substantially darker than the average value (i.e., $I(x) < k_f \cdot \text{avg}(I)$). This is useful for white items such as mushrooms. In this case, the intensity is generally quite high in the object region, but much darker where the bag is just in front of the background. The preferred thresholds in process 800 are $T_S=45$, $T_f=100$, $k_S=k_f=0.5$.

Figure 8A:
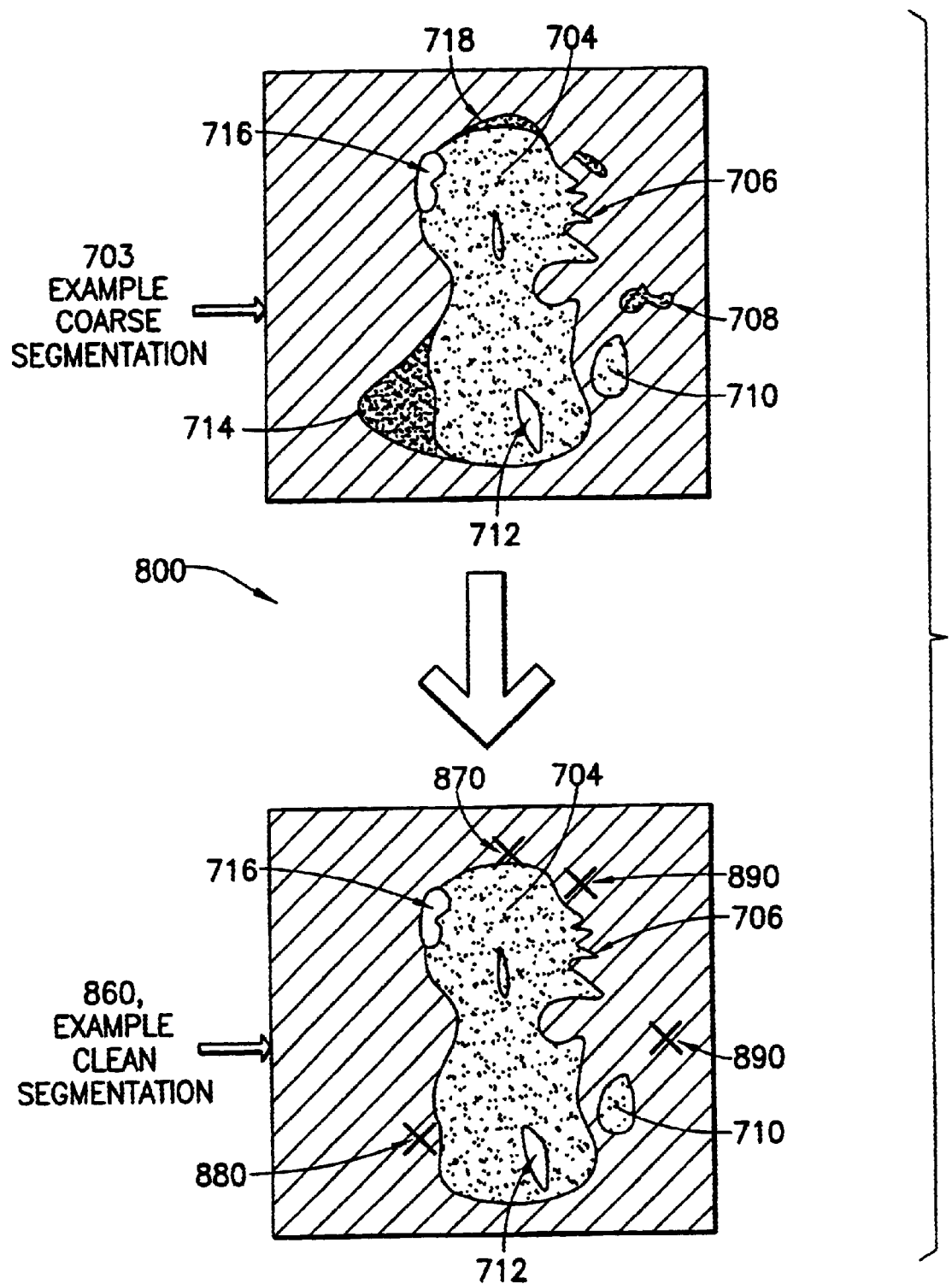
FIG. 8A illustrates the process of removing such unusable image patches by showing example images.

FIG. 8A illustrates the effects of the process of removing such undesired image patches. Given a coarse segmentation 703 (cf FIG. 7), process 800 produces a clean segmentation 860. For a moderately colorful object (passing test 820) areas 714 and 708 that are relatively less saturated than the average saturation (830 in FIG. 8) would be removed (880 and 890). Alternatively, if the foreground image 702 contains a fairly bright object (passing test 840), then an area such as 718 whose intensity is relatively low compared to the average intensity (test 850 in FIG. 8) will be removed 870. Note that in the flow diagram shown in FIG. 8 either 824 is true, 844 is true, or both are false 848. Hence, either relatively low saturated regions are removed or relatively low intensity regions are removed.

Figure 9:
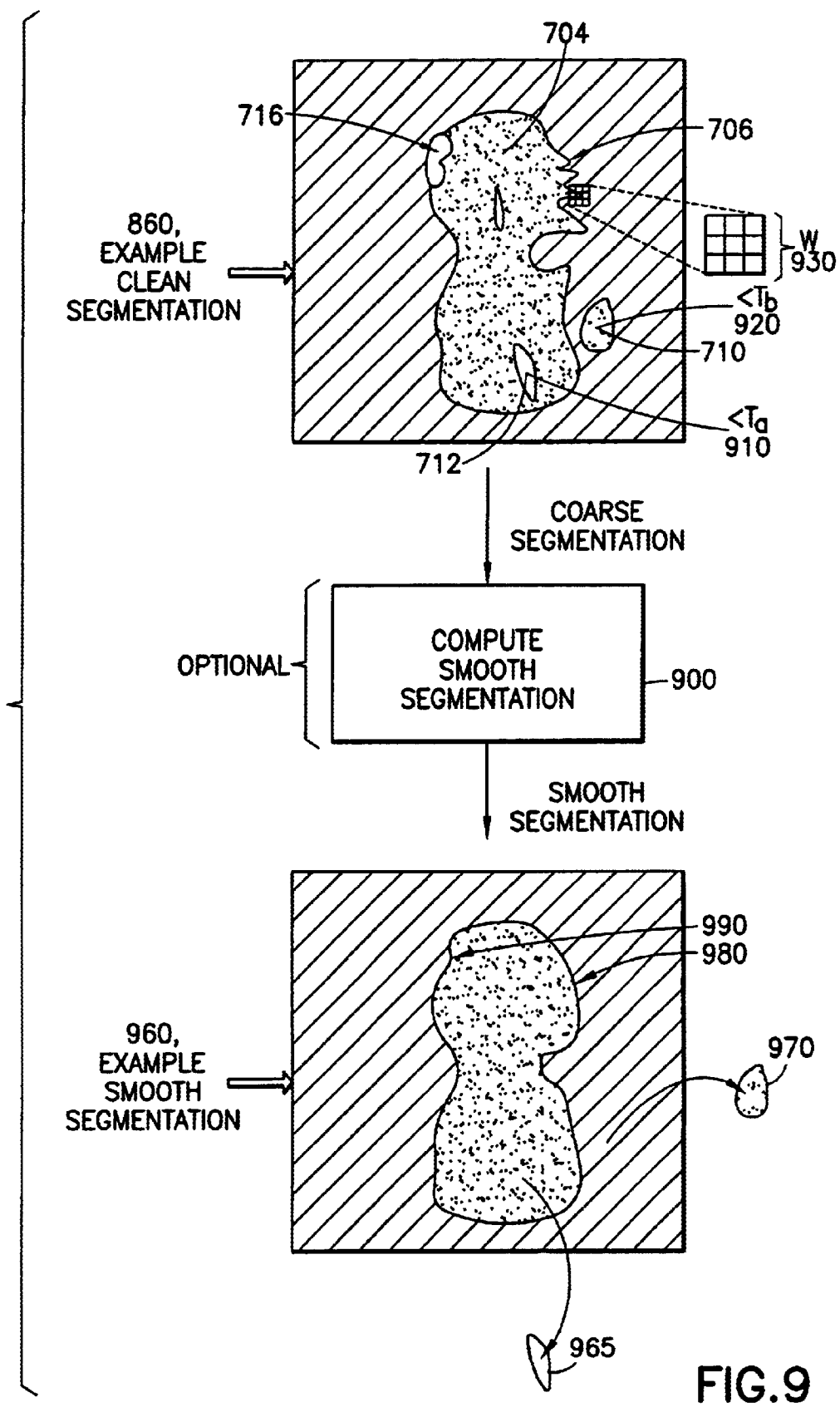
FIG. 9 shows the optional final step of smoothing the segmented image with example images.

Finally, FIG. 9 details the optional process 900 of smoothing the segmented image (also step 900 in FIG. 5). This process takes as input a coarse segmentation and outputs a smooth segmentation. FIG. 7 shows a coarse segmented image 703 which is the output of step 700 (FIG. 5). Processing this image in step 800 of FIG. 5 (see also the flow diagram of FIG. 8) results in example clean image 860 (cf. FIG. 8A). Here the main segment 704 still contains a few artifacts. These are incorrectly labeled regions of example coarse segmentation 703 that are still left over after process 800. Examples include region 710 (disconnected small segments), 712 (white holes in the segmentation), 706 (rough boundaries) and 716 (boundary obscurations).

Process 900 first smoothes the boundaries of segment 704. The purpose is to remove wiggly boundaries of coarse segmentation (such as 706 and 716 of example coarse segmentation 704) that are not removed by process 800. A w by w pixel window W 930 is convolved over the segmentation that computes the sum, sum(W), of the segmentation indicators for the pixels that fall within the window. This sum is a measure of the local density of foreground pixels. If, for a window centered on pixel x, the corresponding sum(W)>$T_c$, then the segmentation indicator of pixel x is set to 1, otherwise it is set to 0. The result is that boundary chunks 706 and 716 are smoothed (980, 990) where the level of smoothing depends on the window size w. In a preferred embodiment w=9 for an image of overall size 320×240 pixels.

Further smoothing is accomplished using connected component analysis. Connected components are regions where there exists a path from any pixel in the region to any other pixel in the region such that the pixels traversed along the path are all within the region itself. Standard variants are 4-connected versus 8-connected components. The distinction is whether diagonal moves are allowed (8-connected) or whether only horizontal and vertical path segments are acceptable (4-connected). The 4-connected variant is used in a preferred embodiment. This prior art technique is described in D. Ballard and C. Brown, *Computer Vision*, Pages 149–152.

Prentice-Hall: New Jersey, 1982.

This reference is incorporated herein in its entirety.

Connected components are used as part of a further step of process 900. This step removes spurious holes within the main segment 704 of the clean segmentation (example segmentation 860), as well as spurious small segment pieces outside the main segment. Holes that are of area smaller than some threshold $T_a$ 910 and islands of area smaller than another threshold $T_b$ 920 are removed from the clean segmentation 704. This is done by performing a connected components analysis for both the foreground pixels and the non-foreground pixels and then measuring the area of each resulting blob. Here the preferred thresholds are $T_a=T_b=\frac{1}{10}$ of the largest segment (i.e., area of 704). That is, a blob is removed 970 or a hole is removed 965 (i.e., filled in) if it is less than 10% of the size of the main segment.

This completes the discussion of the ambient light segmentation system. In summary there are four main phases as depicted in FIG. 5: color correction and transformation to HSI, comparison against the background, removal of specific bag artifacts, and smoothing to improve object boundaries. The described techniques are applicable not only to finding fruits and vegetables, but also to any color imaging system that needs to segment an object from a background.

Having thus described our invention, what we claim as new and desire to secure by Letters Patent is as follows:

1. A computer imaging system, having one or more memories and one or more central processing units (CPU), the system segmenting images of one or more objects from a background image, the system comprising:

one or more image acquisition units that acquire the background image and a combined image of one or more of the objects in front of the background image, the background image and the combined image having two or more spectral bands and being stored in one or more of the memories;

an intensity transform that isolates a light intensity component from each of the combined image and background image, so that a relative reflectance value for each of the spectral bands in both the combined image and background image remains; and a comparison process that performs a pixel by pixel comparison to determine a set of locations where the relative reflectance values differ between the combined image and background image, the set of locations representing a portion of the combined image corresponding to the objects without the background.

2. A system, as in claim 1, where the relative reflectance value includes any one or more of the following: a hue, a saturation, a normalized color component, a combination of a hue and a saturation, a set of hues, a set of saturations, and a set of combined hues and saturations.

3. A system, as in claim 1, where the intensity transform includes any one or more of the following: HSI, HSV, color component ratios, fractional color components, CIE L*u*v* hue angle and saturation, and CIE L*a*b* hue angle and saturation.

4. A computer imaging system, having one or more memories and one or more central processing units (CPU), the system segmenting images of one or more objects from a background image, the system comprising:

one or more image acquisition units that acquire the background imaged and a combined image of one or more of the objects in front of the background image, the background image and the combined image having two or more spectral bands and being stored in one or more of the memories;

a normalization function that normalizes the background image and the combined image so that corresponding pixels have the same response in both images;

an intensity transform that isolates a light intensity component from each of the combined image and background image, so that a pixel-wise reflectance value for each of the spectral bands in both the combined image and background image remains; and a comparison process that performs a pixel by pixel comparison to determine a set of locations where the reflectance values are dissimilar in the combined image and background image, the set of locations representing a portion of the combined image corresponding to the objects without the background.

5. A system, as in claim 4, where the correspondence determination of the normalization function includes any one or more of the following: a) pixels having the same image location in the combined image and the background image and the location having no image of the object, and b) a correspondence between two or more sets of pixel locations where the regions imaged are known to have the same response.

6. A system, as in claim 4, where the response includes any one or more of the follow: a hue value, a saturation value, a combination of one or more hues and a saturation value, and a combination of one or more hues, a saturation, and an intensity value.

7. A system, as in claim 4, where the pixel-wise reflectance value includes any one or more of the following: a hue, a saturation, a normalized color component, a combination of a hue and a saturation, a set of hues, and a set of combined hues and a saturation.

8. A system, as in claim 4, where the intensity transform includes any one or more of the following: HSI, HSV, color component ratios, fractional color components, CIE L*u*v* hue angle and saturation, and CIE L*a*b* hue angle and saturation.

9. A computer imaging system, having one or more memories and one or more central processing units (CPU), the system segmenting images of one or more objects from a background image, the system comprising:

one or more image acquisition units that acquire the background imaged and a combined image of one or more of the objects in front of the background image, the background image and the combined image having two or more spectral bands and being stored in one or more of the memories;

a normalization function that normalizes the background image and the combined image so that corresponding pixels have the same response in both images;

an intensity transform that isolates a light intensity component from each of the combined image and background image, so that a pixel-wise reflectance value for each of the spectral bands in both the combined image and background image remains, the intensity transform also providing an intensity value for the associated pixel; and a comparison process that performs a pixel by pixel comparison to determine a set of locations where any of the reflectance values and associated intensity value are dissimilar in the combined image and background image, the set of locations representing a portion of the combined image corresponding to the objects without the background.

10. A system, as in claim 9, further comprising a cleaning process that removes pixels from the set of locations where the saturation value of the pixels is different from an average saturation value of the pixels in the set by more than a saturation threshold.

11. A system, as in claim 9, further comprising a cleaning process that removes pixels from the set of locations where the intensity value of the pixels is different from an average intensity value of the pixels in the set by more than an intensity threshold.

12. A system, as in claim 9, further comprising a smoothing process that adds pixels to the set of locations where local density of foreground pixels exceeds a first smoothing threshold in order to smooth the boundary.

13. A system, as in claim 9, comprising a smoothing process that removes pixels from the set of locations where local density of foreground pixels falls below a second smoothing threshold in order to smooth the boundary.

14. A system, as in claim 9, further comprising a connecting process comprising the steps of:
- determining a set of foreground connected components on the set of locations:
  - determining the area of each of the foreground connected components; and
  - removing any component that has an area less than a percentage of the area of the largest component in order to eliminate one or more outlying portions of the set of locations.

15. A system, as in claim 9, further comprising a connecting process comprising the steps of:
- determining a set of foreground and background connected components on the set of locations:
  - determining the area of the foreground and background connected components; and
  - adding to the foreground set of locations any background component that has an area less than a percentage of the area of the largest foreground component in order to fill in one or more holes in the set of locations.

16. A method executing on a computer imaging system, the method comprising the steps of:
- acquiring the background image and a combined image of one or more of the objects in front of the background image, the background image and the combined image having two or more spectral bands and being stored in one or more of the memories;
- isolating a light intensity component from each of the combined image and background image, so that a relative reflectance value for each of the spectral bands in both the combined image and background image remains; and
- performing a pixel by pixel comparison to determine a set of locations where the relative reflectance values differ between the combined image and background image, the set of locations representing a portion of the combined image corresponding to the objects without the background.

17. A computer imaging system, having one or more memories and one or more central processing units (CPU), the system segmenting images of one or more objects from a background image, the system comprising:
- means for acquiring the background image and a combined image of one or more of the objects in front of the background image, the background image and the combined image having two or more spectral bands and being stored in one or more of the memories;
- means for isolating a light intensity component from each of the combined image and background image, so that a relative reflectance value for each of the spectral bands in both the combined image and background image remains; and
- means for performing a pixel by pixel comparison to determine a set of locations where the relative reflectance values that differ between the combined image and background image, the set of locations representing a portion of the combined image corresponding to the objects without the background.

18. A computer program product having a method comprising the steps of:
- acquiring the background imaged and a combined image of one or more of the objects in front of the background image, the background image and the combined image having two or more spectral bands and being stored in one or more of the memories;
- isolating a light intensity component from each of the combined image and background image, so that a relative reflectance value for each of the spectral bands in both the combined image and background image remains; and
- performing a pixel by pixel comparison to determine a set of locations where the relative reflectance values differ between the combined image and background image, the set of locations representing a portion of the combined image corresponding to the objects without the background.

* * * * *